US006621929B1

(12) United States Patent
Lai et al.

(10) Patent No.: US 6,621,929 B1
(45) Date of Patent: Sep. 16, 2003

(54) METHOD FOR MATCHING IMAGES USING SPATIALLY-VARYING ILLUMINATION CHANGE MODELS

(75) Inventors: Shang-Hong Lai, Plainsboro, NJ (US); Ming Fang, Cranbury, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/338,298

(22) Filed: Jun. 22, 1999

(51) Int. Cl.[7] .................................................. G06K 9/64
(52) U.S. Cl. ...................... 382/217; 382/181; 382/203; 382/209; 382/220
(58) Field of Search ............................. 382/103, 107, 382/151, 156, 159, 173, 174, 181, 209, 217, 220, 241, 254, 258, 274, 284, 294, 203, 218, 300; 348/154, 155, 169, 699, 441; 356/27; 706/16, 17, 19, 20, 21, 48; 708/290

(56) References Cited

U.S. PATENT DOCUMENTS

| | | | | |
|---|---|---|---|---|
| 5,471,252 A | * | 11/1995 | Iu ............................... | 348/699 |
| 5,495,537 A | * | 2/1996 | Bedrosian et al. .......... | 382/209 |
| 5,581,629 A | * | 12/1996 | Hanna et al. ............... | 382/103 |
| 5,745,668 A | * | 4/1998 | Poggio et al. .............. | 345/475 |
| 5,911,035 A | * | 6/1999 | Tsao ............................ | 706/16 |

OTHER PUBLICATIONS

Hager, et al "Efficient Region Tracking with Parametric Models of Geometry and Illumination", pp. 1025–1039, IEEE, 1998.*

Guillaume, et al "A Gauss–Newton–Like Optimization Algorithm for "Weighted" Nonlinear Least–Squares Poblems", pp. 222–2228, IEEE, 1996.*

Snyder "On the mathematical foundations of smoothness constraints for the determination of optical flow and for surface reconstruction", pp. 1105–1114, IEEE, 1991.*

Barron, et al. "Performance of optical flow techniques", pp. 43–77, International Journal Computer Vision, 1994.*

Zhang "Modelling geometric structure and illumination varation of a scene from real images", pp. 1041–1046, IEEE, 1998.*

Wu, et al. "A correlation–Relaxation–Labeling framework for computing optical flow–Tmplate matching from a new perspective", pp. 843–853, IEEE, 1995.*

* cited by examiner

Primary Examiner—Daniel G. Mariam

(57) ABSTRACT

A method for matching images is provided that includes the step of providing a template image and an input image. The images include pixels, each pixel having an intensity associated therewith. An energy function formed by weighting a sum of squared differences of data constraints corresponding to locations of both the template image and the input image is minimized to determine estimated geometric and spatially-varying illumination-parameters for the input image with respect to the template image. The estimated geometric and spatially-varying illumination parameters are outputted for further processing.

21 Claims, 4 Drawing Sheets

METHOD FOR MATCHING IMAGES USING SPATIALLY-VARYING ILLUMINATION CHANGE MODELS

BACKGROUND

1. Technical Field

The present invention relates generally to image matching and, in particular, to a method for matching images using spatially-varying illumination change models.

2. Background Description

Image matching or image alignment is a fundamental tool in many areas of computer vision, such as, for example, target tracking, motion analysis, object recognition, and automated visual inspection. For target tracking, image matching is used to accurately locate target objects in temporal image sequences. Various image matching techniques provide point or region correspondence in an image sequence for image motion analysis. An essential step for object recognition is pose determination, which can be accomplished by image alignment techniques. In automated visual inspection, image alignment between the inspection image and the reference image is usually the first and the most crucial step.

A large number of image matching techniques have been described in literature to improve the accuracy, generality, robustness, and speed of image matching. They can be classified into two categories, i.e., the feature-based matching approach and the intensity-based matching approach.

The feature-based matching approach requires reliable feature extraction as well as robust feature correspondence to overcome missing feature and outlier problems due to partial occlusion. The main advantage of the feature-based matching approach is robustness against illumination changes.

The intensity-based matching approach is primarily based on the SSD (Sum of Squared Differences) formulation, which does not require feature extraction or direct correspondence between two sets of features. However, this approach is more sensitive to illumination changes than the feature-based approach. In addition, the conventional SSD-based formulation is not robust against occlusion. The SSD formulation is further described by P. Anandan, in "A Computational Framework and an Algorithm for the Measurement of Visual Motion", International Journal of Computer Vision, Vol. 2, No. 3, 1989, pp. 283–310.

An object matching algorithm based on robust estimation and eigenspace projection to recover affine transformations for an object under different views is described by M. J. Black and A. D. Jepson, in "EigenTracking: Robust Matching and Tracking of Articulated Objects Using a View-based Representation", International Journal of Computer Vision, Vol. 26, No. 1, pp. 63–84, 1998. The eigenspace is computed from a collection of images for the same object under different views. Robust estimation is used to allow for partial occlusion.

A region matching and tracking algorithm based on robust framework is described by P. N. Belhumeur and G. D. Hager, in "Efficient Region Tracking With Parametric Models of Geometry and Illumination", IEEE Trans. Pattern Analysis and Machine Intelligence, Vol. 20, No. 10, pp. 1025–1039, 1998. According to the article, the illumination changes are modeled into the SSD formulation using a low-dimensional linear sub-space determined from several images of the same object under different illumination conditions. The main disadvantage of this algorithm is the need for several images of the same object under different illumination conditions to compute the linear sub-space before the tracking process.

Accordingly, it would be desirable and highly advantageous to have a method for matching images that is robust against illumination changes and that does not require several images of the same object under different illumination conditions.

SUMMARY OF THE INVENTION

The present invention is directed to a method for matching images using spatially-varying illumination change models. The present invention is very useful for computer vision applications such as, for example, target tracking, motion analysis, object recognition, and automated visual inspection.

According to a first aspect of the present invention, a method for matching images includes the step of providing a template image and an input image. The images include pixels, each pixel having an intensity associated therewith. An energy function formed by weighting a sum of squared differences of data constraints corresponding to locations of both the template image and the input image is minimized to determine estimated geometric and spatially-varying illumination parameters for the input image with respect to the template image. The estimated geometric and spatially-varying illumination parameters are outputted for further processing.

According to a second aspect of the present invention, the method further includes the step of partitioning the template image into blocks of pixels. A reliability measure is determined for each pixel in each block. Pixel locations are identified for each block having the largest reliability measure.

According to a third aspect of the present invention, the minimizing step further includes the step of calculating a Hessian matrix and a gradient vector of the energy function based on an initial guess of geometric and illumination parameters. The initial guess is updated based on the calculating of the Hessian matrix and the gradient vector of the energy function. The Hessian matrix and the gradient vector of the energy function are iteratively recalculated until an updated guess is within an acceptable increment from a previous updated guess.

According to a fourth aspect of the present invention, the method further includes the step of smoothing the template image to reduce noise effects.

According to a fifth aspect of the present invention, the minimizing step further includes the step of incorporating a spatially-varying illumination change factor into the data constraints to account for pixel intensity changes due to illumination effects.

According to a sixth aspect of the present invention, the minimizing step includes the step of alleviating errors due to nonlinear characteristics in an optical sensor using a consistency measure of image gradients and a nonlinear function of pixel intensities.

According to a seventh aspect of the present invention, the minimizing step includes the step of modeling spatially-varying illumination multiplication and bias factors using low-order polynomials.

According to an eighth aspect of the present invention, the minimizing step further includes the step of dynamically assigning weights to the data constraints based on residues of the data constraints, a consistency measure of image gradients, and a non-linear function of the pixel intensities.

According to a ninth aspect of the present invention, the method further includes the step of generating an initial guess corresponding to initial geometric and illumination parameters of the input image.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method for matching images using spatially varying illumination change models. The invention provides accurate, efficient, and robust image matching between images of varying illumination.

It is to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed.

Figure 1:
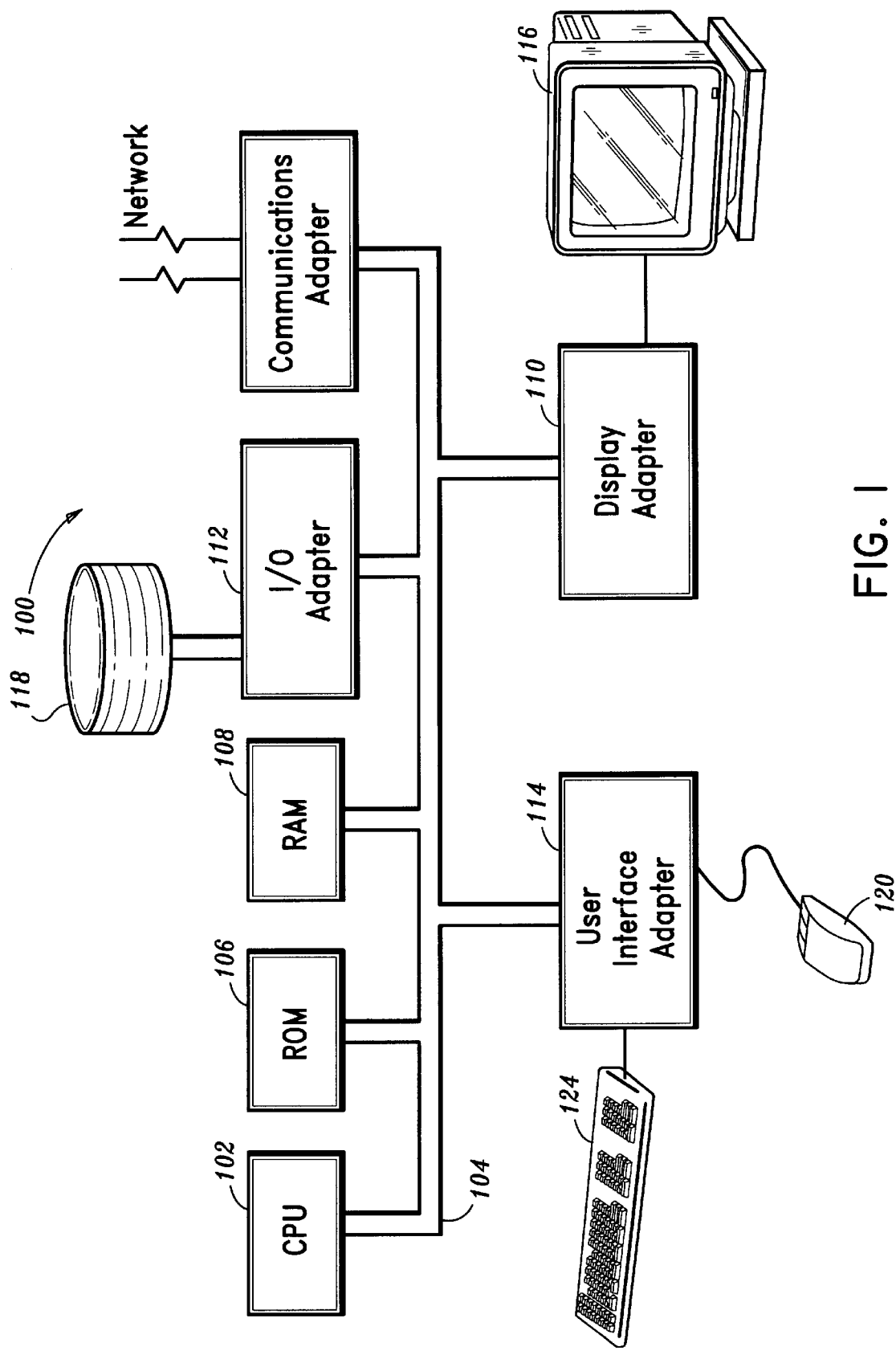
FIG. 1 is a block diagram of a computer processing system to which the present invention may be applied according to an embodiment of the present invention.

FIG. 1 is a block diagram of a computer processing system 100 to which the present invention may be applied according to an embodiment of the present invention. The system 100 includes at least one processor (hereinafter processor) 102 operatively coupled to other components via a system bus 104. A read only memory (ROM) 106, a random access memory (RAM) 108, a display adapter 110, an I/O adapter 112, and a user interface adapter 114 are operatively coupled to system bus 104.

A display device 116 is operatively coupled to system bus 104 by display adapter 110. A disk storage device (e.g., a magnetic or optical disk storage device) 118 is operatively couple to system bus 104 by I/O adapter 112.

A mouse 120 and keyboard 124 are operatively coupled to system bus 104 by user interface adapter 114. The mouse 120 and keyboard 124 are used to input and output information to and from system 100.

A general description of the present invention will now be provided to introduce the reader to the concepts of the invention. Subsequently, more detailed descriptions of various aspects of the invention will be provided.

In general, a robust and efficient image matching method is provided by explicitly modeling the spatially-varying illumination multiplication and bias factors with low-order polynomials. The image matching is formulated as an energy minimization problem with the use of an affine transformation for the geometric transformation and polynomial functions for illumination factors. Then the affine image matching is accomplished by an iterative numerical solution derived from the minimization of an energy function. This framework can be generally extended to other global transformations, such as planar transformation or perspective transformation. In addition, the image region may be partitioned into several sub-regions and an affine transformation assumed for each sub-region to achieve a piecewise affine transformation model for the recovery of non-rigid transformations.

Figure 2:
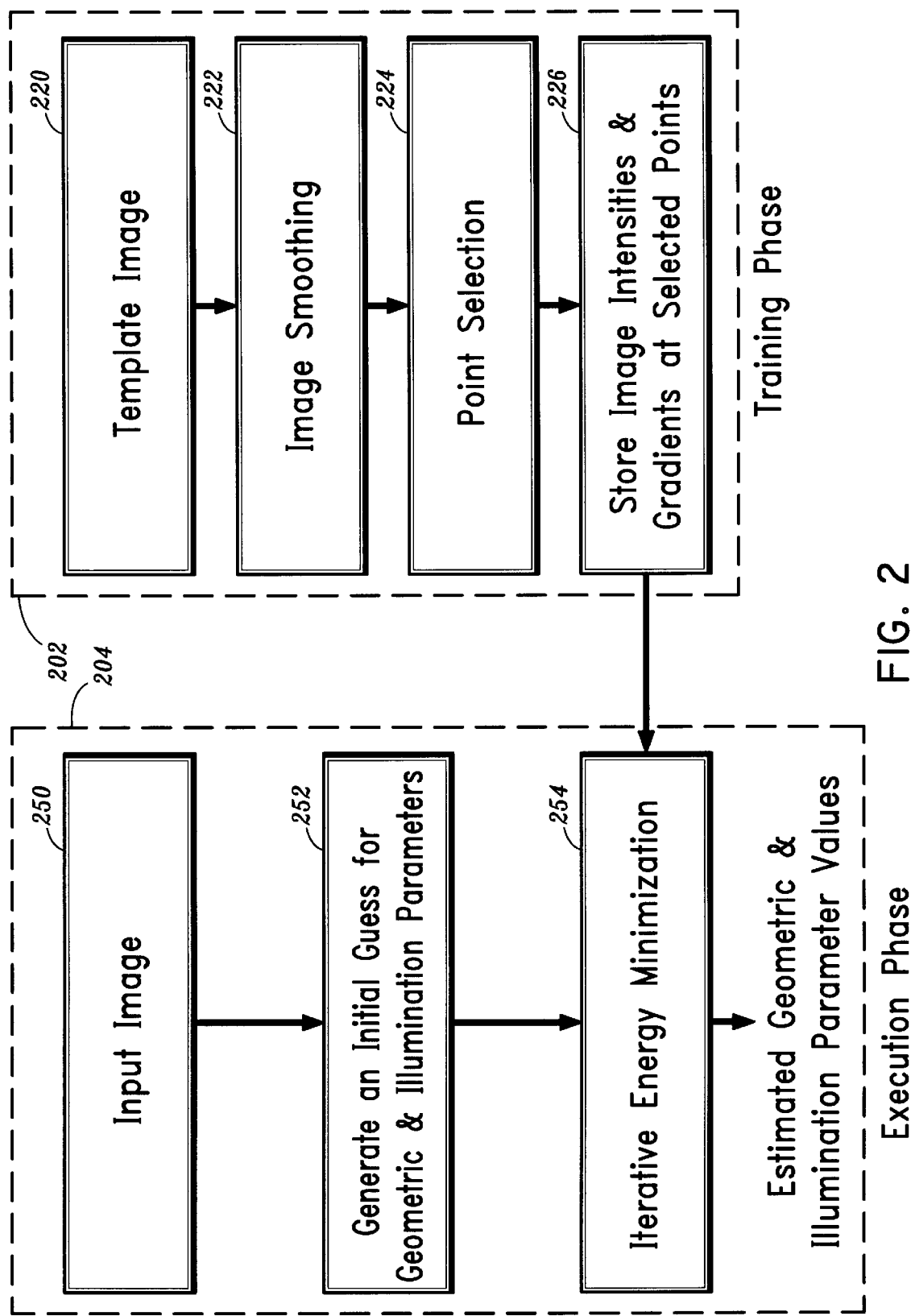
FIG. 2 is a flow chart of a method for matching images using spatially-varying illumination change models according to an embodiment of the present invention.

FIG. 2 is a flow chart of an image matching method 200 according to an embodiment of the present invention. The implementation of an image matching method includes two phases, namely a training phase 202 and an execution phase 204.

The training phase 202 includes the step of receiving a template image (step 220). The template image is smoothed to reduce noise effects (step 222), and then points of the smoothed image are selected (step 224). The image intensities and gradients at the selected points are then stored for later use in the execution phase 204 (step 226). The computation involved in the training phase 202 is related to the template image. Therefore, the training phase 202 can be performed in advance of the capture of the input image corresponding to the execution phase 204. The selecting of points at step 224 is based on predefined criteria described more fully hereinbelow.

The execution phase 204 includes the step of receiving an input image (step 250). An initial guess for the geometric and illumination parameters of the received input image is then generated (step 252). An iterative energy minimization is performed to generate estimated geometric and illumination parameter values (step 254). The energy minimization step is performed using the initial guess generated at step 252 of the execution phase 204 and the image intensities and gradients stored at step 226 of the training phase 202. Moreover, the energy minimization step is performed via a robust, iterative, re-weighted least square process described more fully hereinbelow.

The initial guess generated at step 252 with respect to the geometric parameters is provided via a hierarchical nearest-neighbor search algorithm, as described in U.S. Ser. No. 09/236,725, entitled "A Flash System for Fast and Accurate Pattern Localization", filed on Jan. 25, 1999, assigned to the same assignee as the present invention, and incorporated herein by reference. The hierarchical nearest-neighbor search algorithm for the object localization (geometric parameters) is based on the learning-from-examples principle. A hierarchical nearest-neighbor network is constructed from the training examples synthesized from the geometric transformation of the reference image with the transformation parameters uniformly sampled from the parameter search space. The transformation parameter vector of the nearest-neighbor sample in the hierarchical network provides the approximate object localization. To improve the efficiency of the search algorithm, we find the best match based on the comparisons directly between images. The feature vector used in this algorithm is the normalized wavelet feature. The feature generation process involves image re-sampling, wavelet transformation, and vector normalization. For the illumination parameters, a default constant value is assigned thereto. The initial guess for the geometric and illumination parameters enables the iterative re-weighted least-square algorithm described below with respect to the energy minimization step to converge to the true solution. In a preferred embodiment of the present invention, the initial guess for the illumination parameters is set in such a way that the illumination scaling polynomial function is 1 and the illumination bias polynomial function is 0. However, it is to be appreciated that other values may be used to provide the initial guess. These polynomial functions are described further hereinbelow.

Step 250, as well as step 220, may include digitally capturing an image. The image may be captured using a camera and/or video card installed in the computer processing system 100. Moreover, other forms of equipment may be used, such as, for example, microscopes, monitors, etc.

The energy minimization formulation according to the present invention will now be given. It should be noted that the image matching method of the present invention is an intensity-based approach. Conventional intensity-based methods are derived from the SSD formulation which, in turn, is based on the brightness constancy model given as follows:

$$I_0(x+u, y+v) = I_1(x,y) \qquad (1)$$

where $I_0$ and $I_1$ are the image intensity functions at time $t_0$ and $t_1$, respectively, (u,v) is the displacement vector at a location (x,y).

A generalized brightness model has been previously used to account for uniform photometric variation, that is:

$$I_0(x+u, y+v) = \alpha I_1(x,y) + \beta \qquad (2)$$

Note that the constants $\alpha$ and $\beta$ are the illumination multiplication and bias factors. However, this model cannot account for spatially-varying illumination variations. The above generalized brightness model is described further by J. Coughlan and R. Szeliski, in "Spline-based Image Registration", International Journal of Computer Vision, Vol. 22, No. 3, pp. 199–218, 1997.

To overcome the above restriction, a generalized dynamic image model has been proposed by assuming the illumination multiplication and bias factors ($\alpha$ and $\beta$) to be functions of location (x,y). This dynamic image model is further described by S. Negahdaripour, in "Revised Definition of Optical Flow: Integration of Radiometric and Geometric Cues for Dynamic Scene Analysis", IEEE Trans. Pattern Analysis and Machine Intelligence, Vol. 20, No. 9, pp. 961–979, 1998.

We assume that these two illumination factors are slowly-varying functions of location (x,y). Thus, they can be well-approximated by low-order polynomials of (x,y) as follows:

$$I_0(x+u, y+v) = \alpha_p(x,y) I_1(x,y) + \beta_p(x,y) \qquad (3)$$

where $\alpha_p(x,y)$ and $\beta_p(x,y)$ are the low-order polynomial functions with the coefficients represented by $\alpha = (\alpha_u, \ldots, \alpha_{p-1})$ and $\beta = (\beta_u, \ldots, \beta_{p-1})$, respectively. The resulting polynomial illumination model can account for smooth spatially-varying illumination variations with an additional small number of polynomial coefficients to be determined together with the geometric transformation.

The geometric transformation in the image matching for planar objects can be well represented by an affine transformation when orthographic projection is a good approximation for the situation. It should be noted that a number of methods have been proposed to solve the affine image matching problem. They are described by: M. J. Black and A. D. Jepson, in "EigenTracking: Robust Matching and Tracking of Articulated Objects Using a View-based Representation", International Journal of Computer Vision, Vol. 26, No. 1, pp. 63–84, 1998; P. N. Belhumeur and G. D. Hager, in "Efficient Region Tracking with Parametric Models of Geometry and Illumination", IEEE Trans. Pattern Analysis and Machine Intelligence, Vol. 20, No. 10, pp. 1025–1039, 1998; and J. Coughlan and R. Szeliski, in "Spline-based Image Registration", International Journal of Computer Vision, Vol. 22, No. 3, pp. 199–218, 1997.

The present invention also focuses on the recovery of affine transformations for the image matching. However, this framework can be extended to other global transformations. For an affine transformation, the displacement vector (u,v) at the location (x,y) can be written as follows:

$$u(x,y,a) = a_0 + a_1 x + a_2 y \qquad (4)$$

$$v(x,y,a) = a_3 + a_4 x + a_5 y \qquad (5)$$

where $a = (a_0, a_1, \ldots, a_5)$ is the parameter vector for the affine transformation.

By assuming the displacement vector (u,v) is small, we take the first-order Taylor series approximation on $I_0$ in Eq. (3) to obtain the following data constraint:

$$I_0(x,y) + I_x(x,y) u(x,y,a) + I_y(x,y) v(x,y,a) - \alpha_p(x,y) I_1(x,y) - \beta_p(x,y) = 0 \qquad (6)$$

where $I_x(x,y)$ and $I_y(x,y)$ are the partial derivatives of $I_0$ with respect to x and y Substituting the displacement components u and v in Eq. (6) by the affine model given in Eq. (4) and (5) yields the following constraint equation:

$$I_0 + I_x(x,y)(a_0 + a_1 x + a_2 y) + I_y(x,y)(a_3 + a_4 x + a_5 y) - \alpha_p(x,y) I_1(x,y) - \beta_p(x,y) = 0 \qquad (7)$$

The energy function to be minimized in our image matching algorithm is a weighted sum of squared differences of the above data constraints given as follows:

$$E(a, \alpha, \beta) = \qquad (8)$$

$$\sum_i w_i (I_0(x_i, y_i) + I_{x,i}(a_0 + a_1 x_i + a_2 y_i) + I_{y,i}(a_3 + a_4 x_i + a_5 y_i) -$$

$$\alpha_p(x_i, y_i) I_1(x_1, y_i) - \beta_p(x_i, y_i))^2$$

Note that $I_{x,i} = I_x(x_i, y_i)$, $I_{y,i}(x_i, y_i)$, and $w_i$ is the weight associated with the data constraint computed at the location $(x_i, y_i)$. This weighting allows us to incorporate robust estimation into our energy minimization framework, which is accomplished by dynamically adjusting the weight for each constraint appropriately based on its residue. This dynamic weighting scheme will be described in further detail hereinbelow. The data constraints at the locations within the specified region of interest are combined to form the energy function. Instead of using all the data constraints within the region, a selective sampling is used of the data constraints from all the pixels in this region to reduce the computational cost. This selective constraint sampling strategy will be discussed in further detail hereinbelow.

A description of robust estimation via a dynamic weighting scheme according to the present invention will now be given. Robust estimation has been successfully used in several image matching methods to allow for partial occlusion and to remove outliers. These methods are described by: P. Anandan and M. J. Black, in "The Robust Estimation of Multiple Motions: Parametric and Piecewise-smooth Flow-fields", Computer Vision and Image Processing, Vol. 63, No. 1, pp. 15–104, 1996; M. J. Black and A. D. Jepson, in "EigenTracking: Robust Matching and Tracking of Articulated Objects Using a View-based Representation", International Journal of Computer Vision, Vol. 26, No. 1, pp. 63–84, 1998; and P. N. Belhumeur and G. D. Hager, in "Efficient Region Tracking with Parametric Models of Geometry and Illumination", IEEE Trans. Pattern Analysis and Machine Intelligence, Vol. 20, No. 10, pp. 1025–1039, 1998.

In robust estimation, the quadratic function in the energy function for the least-square estimation is replaced by a $\rho$-function, which assigns smaller weights for constraints with larger residues. Two $\rho$-functions commonly used in computer vision are the Lorentzion function and the Geman & McClure function, respectively given as follows:

$$\rho_{LO}(x, \sigma) = \log\left(1 + \frac{x^2}{2\sigma^2}\right), \quad \rho_{GM}(x, \sigma) = \frac{x^2}{\sigma^2 + x^2}$$

where x is the residue of the data constraint and $\sigma$ is the scale parameter. When using the $\rho$-function for robust estimation in model fitting, the influence for each data constraint to the solution is characterized by an influence function, which is the derivative of the $\rho$-function. If we take the derivatives of the above two $\rho$-functions, we can see the influence functions decrease as the magnitude of the residue increases. This is further described by P. Anandan and M. J. Black, in "The Robust Estimation of Multiple Motions: Parametric and Piecewise-smooth Flow-fields", Computer Vision and Image Processing, Vol. 63, No. 1, pp. 75–104, 1996. For the least-square estimation, the influence function is linearly increasing as the magnitude of the residue increases. Therefore, the least-square estimation is more sensitive to outliers than the robust estimation. To use robust estimation in our energy-minimization framework, we can simply replace the quadratic function by a $\rho$-function in the energy function given in Eq. (8). This yields the following new energy function:

$$E(a, \alpha, \beta) = \sum_i w_i \quad (9)$$

$$\rho(I_0(x_i, y_i) + I_{x,i}(a_0 + a_1 x_i + a_2 y_i) + I_{y,i}(a_3 + a_4 x_i + a_5 y_i) -$$

$$\alpha_p(x_i, y_i)I_1(x_1, y_i) - \beta_p(x_i, y_i))$$

To minimize this energy function using a robust $\rho$-function, we employ the iteratively reweighted least-square approach to efficiently update the solution. This leads to the following iterative procedure according to an embodiment of the present invention:

1. Compute $$g_i = \frac{\partial r_i}{\partial c},$$

where $c=(a,\alpha,\beta)$ and $r_i$ is the residue of the i-th data constraint given by $$I_0(x_i,y_i)+I_{x,j}(a_0+a_1 x_i+a_2 y_i)+I_{y,i}(a_3+a_4 x_i+a_5 y_i)-\alpha_p(x_i,y_i)I_1(x_i,y_i)-\beta_p(x_i,y_i)$$

2. Initialize $c_0$ and $\sigma$; set the iteration index k=0.
3. Compute the residues $r_i$ using the current solution $c_k$.
4. Compute the weight $r_i$ associated with each data constraint $$\tau_i = w_i \frac{\dot{\rho}(r_i)}{r_i}.$$

5. Form the weighted Hessian matrix H by $$H = \sum_i \tau_i g_i g_i^T$$

and the weighted gradient vector $$g = \sum_i \tau_i r_i g_i.$$

6. Update the solution by $c_{k+1} = c_k - H^{-1} g$.
7. Update the scale parameter $$\sigma = \sqrt{\frac{\sum_i \tau_i r_i^2}{\sum_i \tau_i}}$$

8. Set k=k+1.
9. If $c_{k+1} \approx c_k$, stop; else go back to step 3. Note that the dynamic weighting $r_i$ for each data constraint is the multiplication between the original weight $w_i$ and the weight $$\frac{\dot{\rho}(r_i)}{r_i}$$

derived from the robust estimation. This is further described by S. Ayer and H. Sawhney, in "Layered Representation of Motion Video Using Robust Maximum-Likelihood Estimation of Mixture Models and MDL Encoding", Proc. International Conf. On Computer Vision, pp. 717–784, 1995. For the Lorentzian function used herein, the weight $$\frac{\dot{\rho}_{LO}(r)}{r}$$

is given by $$\frac{2}{2\sigma^2 + r^2}.$$

The additional weighting factor $w_i$ associated with each data constraint is used herein to augment the robustness of the estimation by taking a consistency measure between the gradients at the corresponding locations in two images and by taking the nonlinearity of the brightness function into account. This is accomplished by setting $w_i$ to be the multiplication between an exponential function of relative discrepancy between the gradient vectors and two sinusoidal functions of the intensity values at corresponding locations in two images, that is:

$$w_i = e^{-\frac{\|(I_{xj},I_{yj})-(\frac{\partial I_1(x_i,y_i)}{\partial x},\frac{\partial I_1(x_i,y_i)}{\partial y})\|^2}{\lambda\|(I_{xj},I_{yj})\|^2}} \sin\left(\frac{I_0(x_i,y_i)}{255}\pi\right)\sin\left(\frac{I_1(x_i,y_i)}{255}\pi\right) \quad (10)$$

where $\lambda$ is a constant parameter. The first term penalizes large relative discrepancies between the gradients at the corresponding locations in two images for each data constraint. The sinusoidal functions of the intensity values are used to alleviate errors due to the nonlinear characteristics in the sensing of intensity values, especially near brightness saturation or cut-off regions. By incorporating this sinusoidal weighting, we disincline to use constraints with the corresponding intensity values near the saturation or cut-off regions, i.e. 0 or 255, for the update of parameters in the iterative re-weighted least-square algorithm. Thus, we have a very robust scheme to adaptively adjust the weight for each data constraint based on its residue, the gradient discrepancies, and intensity values in an iterative re-weighted least-square algorithm.

Previously, the iterative reweighted least-square process for the minimization of the energy function was described using robust estimation. Now, two additional schemes will be described in this framework to achieve a more efficient and accurate solution. The first is a selective data sampling scheme to reduce the computational cost. The second is an estimation-and-warping process integrated in the iterative reweighted least-square process to achieve an accurate solution.

The description of the selective data sampling scheme will now be given. The energy function is the weighted sum of the ρ-functions of the data constraints. Of course, we can take the sum over all the pixel locations within the region of interest. However, this may cause very high computational cost for large regions. Especially for the above optimization problem of only a few variables, it is not very crucial to use a very large number of constraints. Thus, according to the selective data sampling scheme of the present invention, a sparse set of locations is selected to form the energy function. The selection scheme is designed based on the considerations of efficiency as well as reliability.

In our selection scheme, we first partition the template image into m×n uniform blocks. From our experiments, we found 400 constraints are quite sufficient to provide accurate affine alignment with a bi-linear model for illumination multiplication variations. So we set m×n to be roughly 400. Note that we can use more constraints to obtain higher accuracy or use less constraints to reduce the computational cost. Then, we select a location with a reliable constraint in each block to form the energy function. This scheme provides a diverse spatial distribution of the selected data constraints in the region. The selection of the data constraint in each block is described below.

Since the data constraint is derived from the first-order Taylor series approximation of the brightness function, approximation errors in computing the partial derivatives are inevitable due to inaccurate numerical approximation as well as the temporal and spatial aliasing in the brightness function. These approximation errors are the main source of errors in the data constraints Additional detail regarding the same is described by J. Malik and J. Weber, in "Robust Computation of Optical Flow in a Multiscale Differential Framework", International Journal of Computer Vision, Vol. 14, No. 1, pp. 67–81, 1995; and S.-H. Lai and B. C. Vemuri, in "Reliable and Efficient Computation of Optical Flow", International Journal of Computer Vision, Vol. 29, No. 2, pp. 87–105, 1998. Since linear numerical approximation methods are usually used for the partial derivatives, our feature point selection is primarily determined by comparing the degree of local linearity for all the locations in each block. We define a reliability measure $\delta(x,y)$ associated with the data constraint at location (x,y) as the inverse of the sum of minimum distance errors in a local linear model fitting to the brightness function $I_u$, that is:

$$\delta(x,y) = \frac{I_x^2(x,y) + I_y^2(x,y)}{sse(x,y) + \varepsilon}, \quad (11)$$

where $sse(x,y)$ is the sum of squared errors from the first-order linear fitting in the local neighborhood of location (x,y), and $\varepsilon$ is a small positive number to prevent over-amplification of very small values of $sse(x,y)$ to the reliability measure. Thus, our selection of a reliable data constraint in each block is simply to find the location with the largest reliability measure.

We described the iterative re-weighted least-square algorithm for minimizing the energy function for robust estimation. Thus, the final solution is a compromise of the selected data constraints, which are derived from the first-order Taylor approximation of the generalized brightness assumption given above. To alleviate the errors due to this approximation, we can apply an estimation-and-warping strategy in the iterative re-weighted least-square process as follows. The generalized brightness assumption $I_0(T(x,y)) = \alpha_p(x,y)I_1(x,y) + \beta_p(x,y)$, where $T(x,y)$ is an affine transformation, can be re-written as follows:

$$I_0(x,y) = \alpha_p(T^{-1}(x,y))I_1(T^{-1}(x,y)) + \beta_p(T^{-1}(x,y)) \quad (12)$$

Note that the inverse affine transformation $T^{-1}(x,y)$ is still an affine transformation. Since the polynomial functions $\alpha_p(T^{-1}(x,y))$ and $\beta_p(T^{-1}(x,y))$ are still polynomial functions of the same order, we can write them as $\alpha_p(x,y)$ and $\beta_p(x,y)$ in the data constraint for ease of computation. Thus, we can modify the data constraint with the updated affine parameter as follows:

$$I_x(x,y)(\hat{a}_0 + \hat{a}_1 x + \hat{a}_2 y) + I_y(x,y)(\hat{a}_3 + \hat{a}_4 x + \hat{a}_5 y) + \quad (13)$$
$$I_0(x,y) - \alpha_p(x,y)I_1(T_n^{-1}(x,y)) - \beta_p(x,y) = 0$$

where $T_a^{-1}(x,y)$ is the inverse of the affine transformation with the displacement affine parameter a. The affine transformation $T_a(x,y)$ can be written as:

$$T_a : \binom{x}{y} \to \binom{1+a_1 \quad a_2}{a_4 \quad 1+a_5}\binom{x}{y} + \binom{a_0}{a_3} \quad (14)$$

with $a=(a_0,a_1,a_2)$ being the affine parameter vector for the displacement vector as given in Equations (4) and (5). The inverse affine transformation $T_a^{-1}(x,y)$ can be derived to be as follows:

$$T_a^{-1} : \begin{pmatrix} x \\ y \end{pmatrix} \rightarrow \begin{pmatrix} 1+a_1 & a_2 \\ a_4 & 1+a_5 \end{pmatrix}^{-1} \begin{pmatrix} x \\ y \end{pmatrix} - \begin{pmatrix} 1+a_1 & a_2 \\ a_4 & 1+a_5 \end{pmatrix}^{-1} \begin{pmatrix} a_0 \\ a_3 \end{pmatrix} \quad (15)$$

Thus, the residue in each iteration of the iterative re-weighted least-square process is computed based on the above new constraint equation. In addition, the new affine parameter $a_{k+1}$ is updated to be the affine parameter of the composite affine transformation $T_{\hat{a}}(T_{a_1}(x,y))$, where $\hat{a}$ is the affine parameter vector obtained in step 6 above. In particular, the modified iterative re-weighted least-square process according to an embodiment of the present invention is given as follows:

1. Compute $$g_i = \frac{\partial r_i}{\partial c},$$

where $c=(a,\alpha,\beta)$ and $r_i$ is the residue of the i-th data constraint given by $$I_0(x_i,y_i)+I_{x,i}(a_0+a_1x_i+a_2y_i)+I_{y,i}(a_3+a_4x_i+a_5y_i)-\alpha_p(x_i,y_i)I_1(x_i,y_i)-\beta_p(x_i,y_i)$$

2. Initialize $c_0$ and $\sigma$; set the iteration index k=0.
3. Compute the residues $r_i$ in Eq. (13) with $a=a_k$, $\hat{n}=0$, $\alpha=\alpha_k$ and $\beta=\beta_k$.
4. Determine the weight $r_i$ associated with each data constraint by $$\tau_i = \frac{w_i}{2\sigma^2 + r_i^2}$$

with $w_i$ computed from Eq. (10).
5. Form the weighted Hessian matrix H by $$H = \sum_i \tau_i g_i g_i^T$$

and the weighted gradient vector $$g = \sum_i \tau_i r_i g_i.$$

6. Compute the increment vector $\Delta c_k = -H^{-1}g$ and update the solution by $\alpha_{k+1}=\alpha_k+\Delta\alpha_k$, $\beta_{k+1}=\beta_k+\Delta\beta_k$ and the affine parameters are updated as follows $$\begin{bmatrix} a_1^{(k+1)} & a_2^{(k+1)} \\ a_4^{(k+1)} & a_5^{(k+1)} \end{bmatrix} = \begin{bmatrix} 1+\Delta a_1 & \Delta a_2 \\ \Delta a_4 & 1+\Delta a_5 \end{bmatrix} \begin{bmatrix} 1+a_1^{(k)} & a_2^{(k)} \\ a_4^{(k)} & 1+a_5^{(k)} \end{bmatrix} - \begin{bmatrix} 1 & 0 \\ 0 & 1 \end{bmatrix}, \quad (14)$$

$$\begin{bmatrix} a_0^{(k+1)} \\ a_3^{(k+1)} \end{bmatrix} = \begin{bmatrix} 1+\Delta a_1 & \Delta a_2 \\ \Delta a_4 & 1+\Delta a_5 \end{bmatrix} \begin{bmatrix} a_0^{(k)} \\ a_3^{(k)} \end{bmatrix} + \begin{bmatrix} \Delta a_0 \\ \Delta a_3 \end{bmatrix}. \quad (15)$$

7. Update the scale parameter $$\sigma = \sqrt{\frac{\sum_i \tau_i r_i^2}{\sum_i \tau_i}}$$

8. Set k=k+1.
9. If $c_{k+1} \approx c_k$, stop; else go back to step 3.

Experimental results obtain by the present invention will now be described. We have applied the image matching method of the present invention to align images for industrial inspection under different illumination conditions and partial occlusions. Image alignment is a very important step in industrial inspection. The image reference approach that is popular in industrial inspection requires very precise image alignment to proceed further inspection tasks. This is further described by A. K. Jain and T. S. Newman, in "A Survey of Automatic Visual Inspection," Computer Vision and Image Understanding, Vol. 61, No. 2, pp. 231–262, 1995.

Since the iterative re-weighted least-square process requires a good initial guess to converge to the true solution, we apply a hierarchical nearest-neighbor search algorithm as the first step to provide a rough initial guess for the proposed image matching algorithm. The hierarchical nearest-neighbor search algorithm is described in U.S. Ser. No. 09/236,725, entitled "A Flash System for Fast and Accurate Pattern Localization", filed on Jan. 25, 1999, assigned to the same assignee as the present invention, and incorporated herein by reference.

Figure 3A:
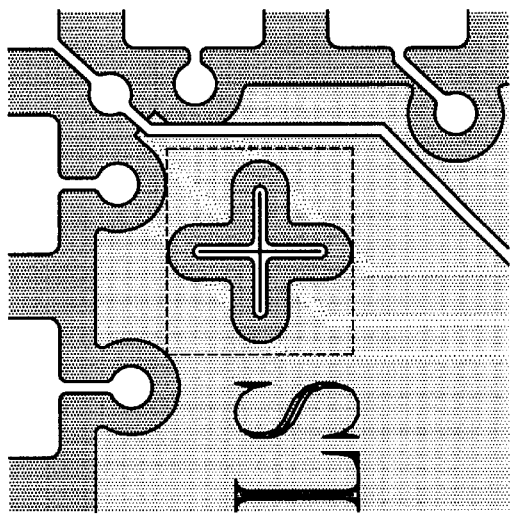
FIG. 3 is a diagram illustrating a reference image and example images aligned thereto under different spatially varying illumination conditions according to the present invention.
Figure 3B:
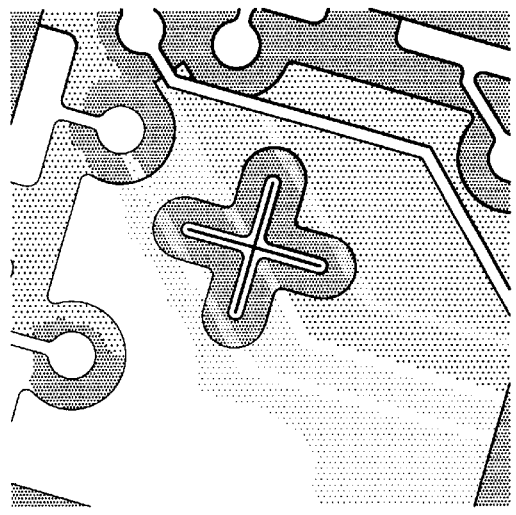
Figure 3C:
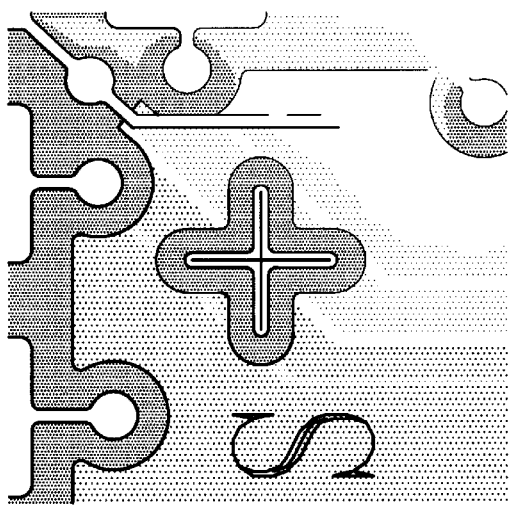
Figure 3D:
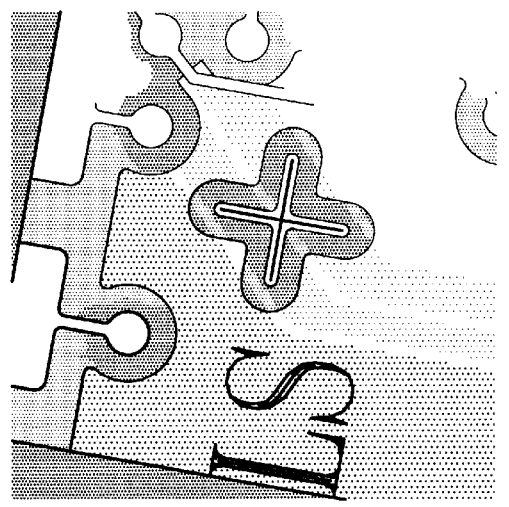

We employed a bilinear model for the illumination multiplication function and a constant model for the illumination bias. FIG. 3 is a diagram illustrating a reference image and example images aligned thereto under different spatially varying illumination conditions according to the present invention. In particular, FIG. 3A corresponds to the reference image, with the region of interest specified in the dashed window and the reference position specified with a cross symbol. FIGS. 3b–d correspond to the example images and show accurate affine image alignment, with the cross symbols specifying the estimated reference locations. For most cases, our iterative algorithm converged reasonably well within 20 iterations. It took less than 0.03 seconds for each image matching task on a Pentium II 450 MHz PC with 128 Mb RAM.

Figure 4A:
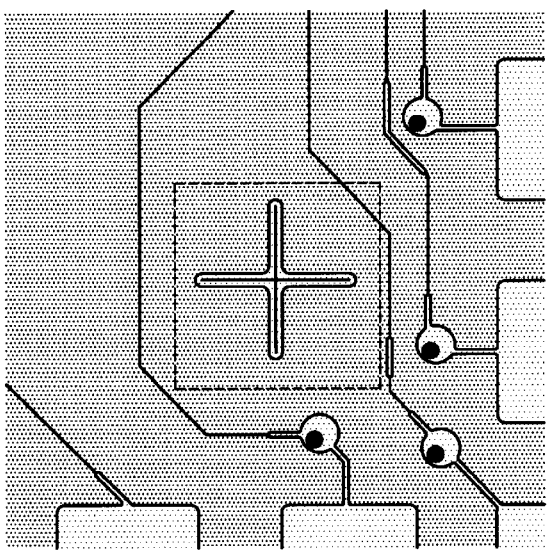
FIG. 4 is a diagram illustrating another reference image and other example images aligned thereto under partial occlusion and spatially varying illumination conditions according to the present invention.
Figure 4B:
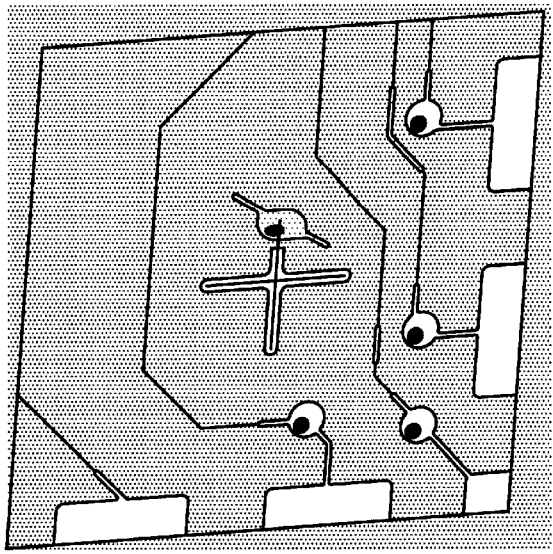
Figure 4C:
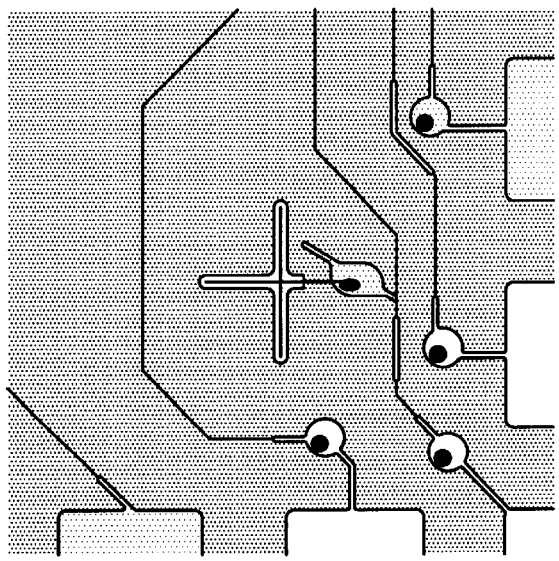

FIG. 4 is a diagram illustrating another reference image and other example images aligned thereto under partial occlusion and spatially varying illumination conditions according to the present invention. In particular, FIG. 4a corresponds to the reference image, with the region of interest specified in the dashed window and the reference position specified with a cross symbol. FIGS. 4b and 4c correspond to the example images and show accurate affine image alignment, with the cross symbols specifying the estimated reference locations. The image occlusions are simulated by randomly placing a small component pattern onto the inspection image.

The present invention provides d robust and efficient image matching method by explicitly modeling the spatially-varying illumination multiplication and bias factors with low-order polynomials. The image matching is formulated as an energy minimization problem with the use of an affine transformation for the geometric transformation and polynomial functions for illumination factors. The data constraints are derived from the first-order Taylor approximation of the generalized brightness assumption with low-order polynomial models for modeling spatially varying illumination changes. We incorporate the basic penalty function from robust estimation into the new energy function that is a combination of the data constraints. An iterative re-weighted least-square algorithm is used to solve the optimization problem, A dynamic weighting scheme is used to improve the robustness of the matching algorithm. This involves the use of a consistency measure of image gradients as well as a nonlinear function of the intensity values to alleviate the errors due to the nonlinear characteristics in the optical sensor. Experimental results demonstrate the robustness, efficiency and accuracy of the image matching method of the present invention.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for matching images, comprising the steps of:
providing a template image and an input image, the images comprising pixels, each pixel having an intensity associated therewith;
minimizing an energy function formed by weighting a sum of squared differences of data constraints corresponding to locations of both the template image and the input image to determine estimated geometric and spatially-varying illumination parameters for the input image with respect to the template image, wherein said minimizing step comprises the step of modeling spatially-varying illumination multiplication and bias factors using low-order polynomials;
outputting the estimated geometric and spatially-varying illumination parameters for further processing wherein said minimizing step further comprises the steps of: calculating a Hessian matrix and a gradient vector of the energy function based on an initial guess of geometric and illumination parameters; updating the initial guess based on the calculating of the Hessian matrix and the gradient vector of the energy function; and iteratively recalculating the Hessian matrix and the gradient vector of the energy function until an updated guess is within an acceptable increment from a previous updated guess.

2. The method as recited in claim 1, further comprising the steps of:
partitioning the template image into blocks of pixels;
determining a reliability measure for each pixel in each block; and
identifying pixel locations for each block having a largest reliability measure.

3. The method as recited in claim 1, further comprising the step of smoothing the template image to reduce noise effects.

4. The method as recited in claim 1, wherein said minimizing step further comprises the step of incorporating a spatially-varying illumination change factor into the data constraints to account for pixel intensity changes due to illumination effects.

5. The method as recited in claim 1, wherein said minimizing step comprises the step of alleviating errors due to nonlinear characteristics in an optical sensor using a consistency measure of image gradients and a nonlinear function of pixel intensities.

6. The method as recited in claim 1, wherein said minimizing step further comprises the step of dynamically assigning weights to the data constraints based on residues of the data constraints, a consistency measure of image gradients, and a non-linear function of the pixel intensities.

7. The method as recited in claim 1, further comprising the step of generating an initial guess corresponding to initial geometric and illumination parameters of the input image.

8. A method for matching images, comprising the steps of:
providing a template image comprising pixels, and selecting a portion of the pixels thereof;
providing an input image;
generating an initial guess for geometric and illumination parameter values of the input image;
minimizing an energy function formed by weighting a sum of data constraints corresponding to a region of interest in both the template image and the input image to determine estimated geometric and spatially-varying illumination parameter values between the template image and the input image, wherein said minimizing step comprises the step of modeling spatially-varying illumination multiplication and bias factors using low-order polynomials;
outputting the estimated geometric and spatially-varying illumination parameters for further processing wherein said minimizing step further comprises the steps of: calculating a Hessian matrix and a gradient vector of the energy function based on an initial guess of geometric and illumination parameters; updating the initial guess based on the calculating of the Hessian matrix and the gradient vector of the energy function; and iteratively recalculating the Hessian matrix and the gradient vector of the energy function until an updated guess is within an acceptable increment from a previous updated guess.

9. The method as recited in claim 8, wherein said selecting step comprises the steps of:
partitioning the template image into blocks of pixels;
determining a reliability measure for each pixel in each block; and
identifying pixel locations for each block having the largest reliability measure.

10. The method as recited in claim 8, further comprising the step of smoothing the template image to reduce noise effects.

11. The method as recited in claim 8, wherein said minimizing step further comprises the step of incorporating a spatially-varying illumination change factor into the data constraints to account for pixel intensity changes due to illumination effects.

12. The method as recited in claim 8, wherein said minimizing step comprises the step of alleviating errors due to nonlinear characteristics in an optical sensor using a consistency measure of image gradients did a nonlinear function of pixel intensities.

13. The method as recited in claim 8, wherein said minimizing step further comprises the step of dynamically assigning weights to the data constraints based on residues of the data constraints, a consistency measure of image gradients, and a non-linear function of pixel intensity values.

14. The method as recited in claim 8, further comprising the step of generating an initial guess corresponding to initial geometric and illumination parameters of the input image.

15. A program storage device readable by machine, tangibly embodying a program of instructions executable by the machine to perform method steps for matching images, said method steps comprising:
providing a template image and an input image, the images comprising pixels, each pixel having an intensity associated therewith;
minimizing an energy function formed by weighting a sum of squared differences of data constraints corresponding to locations of both the template image and the input image to determine estimated geometric and spatially-varying illumination parameters for the input image with respect to the template image, wherein said minimizing step comprises the step of modeling spatially-varying illumination multiplication and bias factors using low-order polynomials;

outputting the estimated geometric and illumination parameters for further processing wherein said minimizing step further comprises the steps of: calculating a Hessian matrix and a gradient vector of the energy function based on an initial guess of geometric and illumination parameters; updating the initial guess based on the calculating of the Hessian matrix and the gradient vector of the energy function; and iteratively recalculating the Hessian matrix and the gradient vector of the energy function until an updated guess is within an acceptable increment from a previous updated guess.

16. The program storage device as recited in claim 15, further comprising the steps of:

partitioning the template image into blocks of pixels;

determining a reliability measure for each pixel in each block; and identifying pixel locations for each block having a largest reliability measure.

17. The program storage device as recited in claim 15, further comprising the step of smoothing the template image to reduce noise effects.

18. The program storage device as recited in claim 15, wherein said minimizing step further comprises the step of incorporating a spatially-varying illumination change factor into the data constraints to account for pixel intensity changes due to illumination effects.

19. The program storage device as recited in claim 15, wherein said minimizing step comprises the step of alleviating errors due to nonlinear characteristics in an optical sensor using a consistency measure of image gradients and a nonlinear function of pixel intensities.

20. The program storage device as recited in claim 15, wherein said minimizing step further comprises the step of dynamically assigning weights to the data constraints based on residues of the data constraints, a consistency measure of image gradients, and a non-linear function of the pixel intensities.

21. The program storage device as recited in claim 15, further comprising the step of generating an initial guess corresponding to initial geometric and illumination parameters of the input image.

* * * * *